(12) United States Patent
Yuen

(10) Patent No.: US 6,408,085 B1
(45) Date of Patent: Jun. 18, 2002

(54) SYSTEM FOR MATCHING NODES OF SPATIAL DATA SOURCES

(75) Inventor: Patrick W. Yuen, Thornton, CO (US)

(73) Assignee: Space Imaging lp, Thornton, CO (US)

( * ) Notice: Subject to any disclaimer, the term of this patent is extended or adjusted under 35 U.S.C. 154(b) by 0 days.

(21) Appl. No.: 09/120,670

(22) Filed: Jul. 22, 1998

(51) Int. Cl.$^7$ .............................................. G06K 9/00
(52) U.S. Cl. ..................... 382/113; 382/201; 701/104.1
(58) Field of Search ................. 382/113, 159, 382/294, 293, 201; 395/600; 707/104.1

(56) References Cited

U.S. PATENT DOCUMENTS

| | | | | |
|---|---|---|---|---|
| 5,416,894 A | * | 5/1995 | Tanaka | 395/133 |
| 5,546,107 A | * | 8/1996 | Deretsky | 395/600 |
| 5,629,905 A | * | 5/1997 | Lau | 367/54 |
| 5,719,949 A | * | 2/1998 | Koeln et al. | 382/113 |
| 5,862,245 A | * | 1/1999 | Renouard et al. | 382/113 |
| 5,864,632 A | * | 1/1999 | Ogawa et al. | 382/113 |
| 5,978,520 A | * | 11/1999 | Maruyama et al. | 382/294 |
| 6,044,171 A | * | 3/2000 | Polyakov et al. | 382/159 |
| 6,084,989 A | * | 7/2000 | Eppler | 382/293 |
| 6,178,381 B1 | * | 1/2001 | Padhi | 702/18 |
| 6,215,519 B1 | * | 4/2001 | Nayar | 348/159 |
| 6,278,445 B1 | * | 8/2001 | Tanaka | 345/178 |

OTHER PUBLICATIONS

Alan Saalfeld: "Conflation; Automated Map Compilation"; Int. J. Geographical Information Systems, 1988, vol. 2, No. 3, pp. 217–228.

Maureen P. Lynch & Alan J. Saalfeld: "Conflation: Automated Map Compilation—a Video Game Approach"; Statistical Research Division, Bureau of the Census, Washington, DC; 5 pages.

Alan John Saafeld: "Conflation: Automated Map Compilation"; Dissertation to University of Maryland 1993, 87 pages.

\* cited by examiner

Primary Examiner—Leo Boudreau
Assistant Examiner—M B Choobin
(74) Attorney, Agent, or Firm—Holland & Hart

(57) ABSTRACT

A system for matching nodes of different spatial data sources. The system matches or ties a node from one data source to another data source. The present invention uses a highly accurate exclusion technique for excluding potential corresponding nodes of a second data source. Potential corresponding nodes are selected using node degree comparison, adjacency, fourier descriptor analysis of shapes formed by connecting paths between a node under investigation and a secondary node associated with that node under investigation, an analysis of total length to secondary nodes, an angle analysis to eliminate reflections, a secondary node degree analysis, and a surrounding node correlation coefficient comparison. Using one or more of these techniques in various combinations can result in the selection of a potential corresponding node with a high degree of accuracy.

46 Claims, 12 Drawing Sheets

SYSTEM FOR MATCHING NODES OF SPATIAL DATA SOURCES

BACKGROUND OF THE INVENTION

A. Field of the Invention

The present invention pertains generally to conflation, and more particularly to the matching of nodes of spatial data from different data sources.

B. Description of the Background

Data can be represented spatially to provide a format for pictorially displaying that data. The displayed data may take the form of a map, a graph, charts, holograms, and other various types of two- and three-dimensional representations. For example, the U.S. government provides vector data (source data) that is known as "TIGER", data that is representative of maps that cover the entire United States. This data indicates roads and other geographical landmarks, as well as what is referred to as "attribute data". Attribute data is located at the nodes between the vectors of the source data, and provides information such as street names and addresses, zoning, school districts, average home prices, average income, and various other demographic data that is associated with the particular location of that node. Of course, this information is valuable information to have available when looking at a particular geographical area.

One of the problems, however, is that typically the source data is faulty in some respects. For example, because of the way the data was obtained, it may not be spatially correct. There may be problems with scaling, skewing, offset, rotation, and other similar problems. Typically, these distortions are not systematic distortions that can be corrected in a systematic fashion. For example, in one portion of a map rotational distortion may be present, and another portion of the map may include an offset distortion. This results sometimes from the manner in which the data was collected, such as mistakes in surveying and other similar problems. Furthermore, the source data is typically not updated regularly, so that it does not include changes that have occurred. For example, source data may typically not include entire housing subdivisions or associated roads in newly-developed areas. This is the result of the fact that the source data from the government may not be updated for a number of years. It is therefore desirable to have information that is updated on a prompt and regular basis and that is spatially correct.

Digitized data, such as that provided by photographing land areas from high altitude airplanes and space satellites is capable of providing spatially correct data that can be promptly and periodically updated. This data can also be provided in a vector format such as the source data. However, digitized data that is provided in this fashion does not include accompanying attribute data, such as the attribute data provided with source data from the government.

Hence, it would be desirable to have data that is spatially correct and also includes associated attribute data which has not been provided previously with spatially correct sources of digitized data. More generally, it would be desirable to have a process for automatically tying a node from one data source to a corresponding node of a similar data source.

SUMMARY OF THE INVENTION

The present invention overcomes the disadvantages and limitations of the prior art by providing a system for matching nodes from separate data sources.

The present invention may therefore comprise a process of tying a selected node of a first data source to a corresponding node of a second data source comprising the steps of generating trace coordinates between the selected node and secondary nodes associated with the selected node, generating trace coordinates between potential corresponding nodes of the second data source and secondary nodes associated with the potential corresponding nodes, generating a fourier descriptor of the trace coordinates associated with the selected node, generating fourier descriptors of the trace coordinates associated with the potential corresponding nodes, comparing the fourier descriptors of the trace coordinates associated with the selected node with the fourier descriptors of the trace coordinates associated with the potential corresponding nodes to eliminate nonrelevant potential corresponding nodes of the potential corresponding nodes, tying the selected node to a single remaining node of the potential corresponding nodes that corresponds to the corresponding node.

The present invention may also comprise a computer system that is programmed to tie a selected node of a first data source to a corresponding node of a second data source by performing at least the steps of generating trace coordinates between the selected node and secondary nodes associated with the selected node; generating trace coordinates between potential corresponding nodes of the second data source and secondary nodes associated with the potential corresponding nodes, generating a fourier descriptor of the trace coordinates associated with the selected node, generating fourier descriptors of the trace coordinates associated with the potential corresponding nodes, comparing the fourier descriptors of the trace coordinates associated with the selected node with the fourier descriptors of the trace coordinates associated with the potential corresponding nodes to eliminate nonrelevant potential corresponding nodes of the potential corresponding nodes, tying the selected node to a single remaining node of the potential corresponding nodes that corresponds to the corresponding node.

The present invention may also comprise a computer-readable medium that contains program code that is capable of causing a computer to perform a process of tying a selected node of a first data source to a corresponding node of a second data source in accordance with the steps comprising generating trace coordinates between the selected node and secondary nodes associated with the selected node, generating trace coordinates between potential corresponding nodes of the second data source and secondary nodes associated with the potential corresponding nodes, generating a fourier descriptor of the trace coordinates associated with the selected node, generating fourier descriptors of the trace coordinates associated with the potential corresponding nodes, comparing the fourier descriptors of the trace coordinates associated with the selected node with the fourier descriptors of the trace coordinates associated with the potential corresponding nodes to eliminate nonrelevant potential corresponding nodes of the potential corresponding nodes, tying the selected node to a single remaining node of the potential corresponding nodes that corresponds to the corresponding node.

The present invention may also comprise a computer system that is programmed to tie a selected node of a first data source to a corresponding node of a second data source comprising means for generating trace coordinates between the selected node and secondary nodes associated with the selected node, means for generating trace coordinates between potential corresponding nodes of the second data source and secondary nodes associated with the potential corresponding nodes, means for generating a fourier descriptor of the trace coordinates associated with the selected node, means for generating fourier descriptors of the trace coordinates associated with the potential corresponding nodes, means for comparing the fourier descriptors of the trace coordinates associated with the selected node with the fourier descriptors of the trace coordinates associated with the potential corresponding nodes to eliminate nonrelevant potential corresponding nodes of the potential corresponding nodes, means for tying the selected node to a single remaining node of the potential corresponding nodes that corresponds to the corresponding node.

The advantages of the present invention are that corresponding nodes from a first source of data such as a source of digitized data can be tied to corresponding nodes of a second data source such as the source data that is provided by the government. In this manner, the spatially correct data can access the attribute data at the corresponding nodes of the source data to provide a system in which a spatially accurate and updated data source can be provided together with the accompanying attribute data. Additionally, the present invention utilizes an exclusion technique that is highly accurate to ensure that nodes are matched with a high degree of accuracy. This allows the matched nodes to be utilized for various purposes in addition to providing tie points between nodes, including conflation and other beneficial functions.

DETAILED DESCRIPTION OF THE PREFERRED EMBODIMENT OF THE INVENTION

Figure 1:
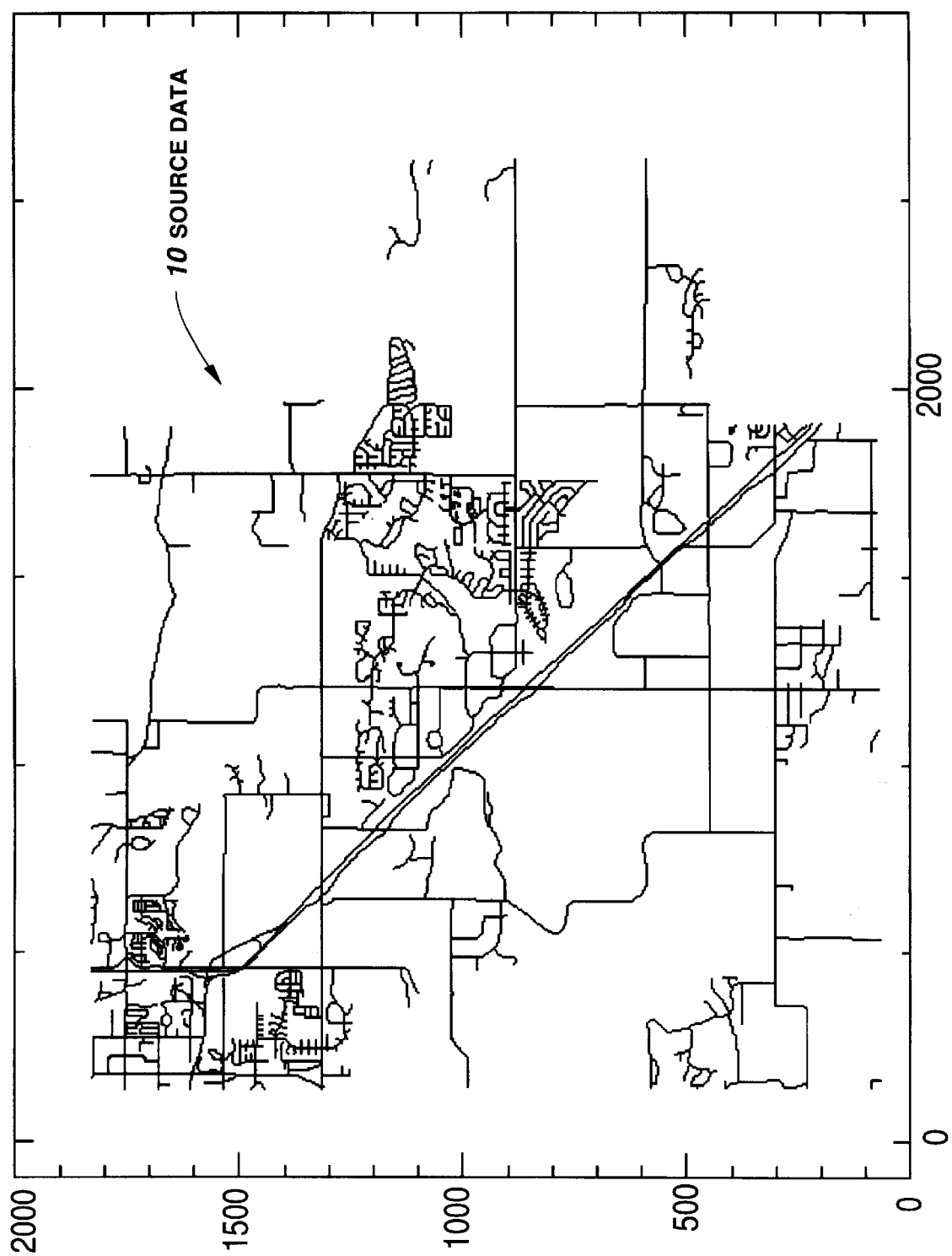
FIG. 1 is an example of a set of source data.

FIG. 1 illustrates an example of a set of source data 10. As illustrated in FIG. 1, the source data 10 is representative of spatial data such as roads that are typically be illustrated in a map. In fact, the source data illustrated in FIG. 1 is a portion of the diagonal Highway 36 that is located between Boulder, Colo. and Longmont, Colo. The data is provided in vector format. The vector data indicates the beginning of the vector and its direction and length, to form each of the lines that indicate the roads shown in FIG. 1. Vectors can be formed from either straight lines or predetermined curves. The vector data can be provided in an ASCII format so that it can be decoded and read using standard ArcView software available from Esri Inc., Redlands, Calif. Of course, the data of FIG. 1 is represented in the form of a two-dimensional map having spatial coordinates. The data can similarly be representative of three-dimensional spatial coordinates or other additional coordinate systems having four or more coordinates. Additionally, the present invention is not limited to spatial coordinate systems, but can be used to match corresponding nodes in any two or more separate data sources. The data can also be representative of other information such as the location of circuits or circuit traces on integrated circuits, printed circuit boards or hardwired layouts.

As also illustrated in FIG. 1, the intersection of each of the roads comprises a node. Each of these nodes is tied to an additional source of data called "attribute data". The attribute data provides various demographic information and other information relating to that particular node. For example, the attribute data may indicate the name of each of the roads, street addresses at that location, and other attributes that are described above. A user of the source data may then position a cursor over the node and click at that point to retrieve the attribute data that is available for that particular node.

Figure 2:
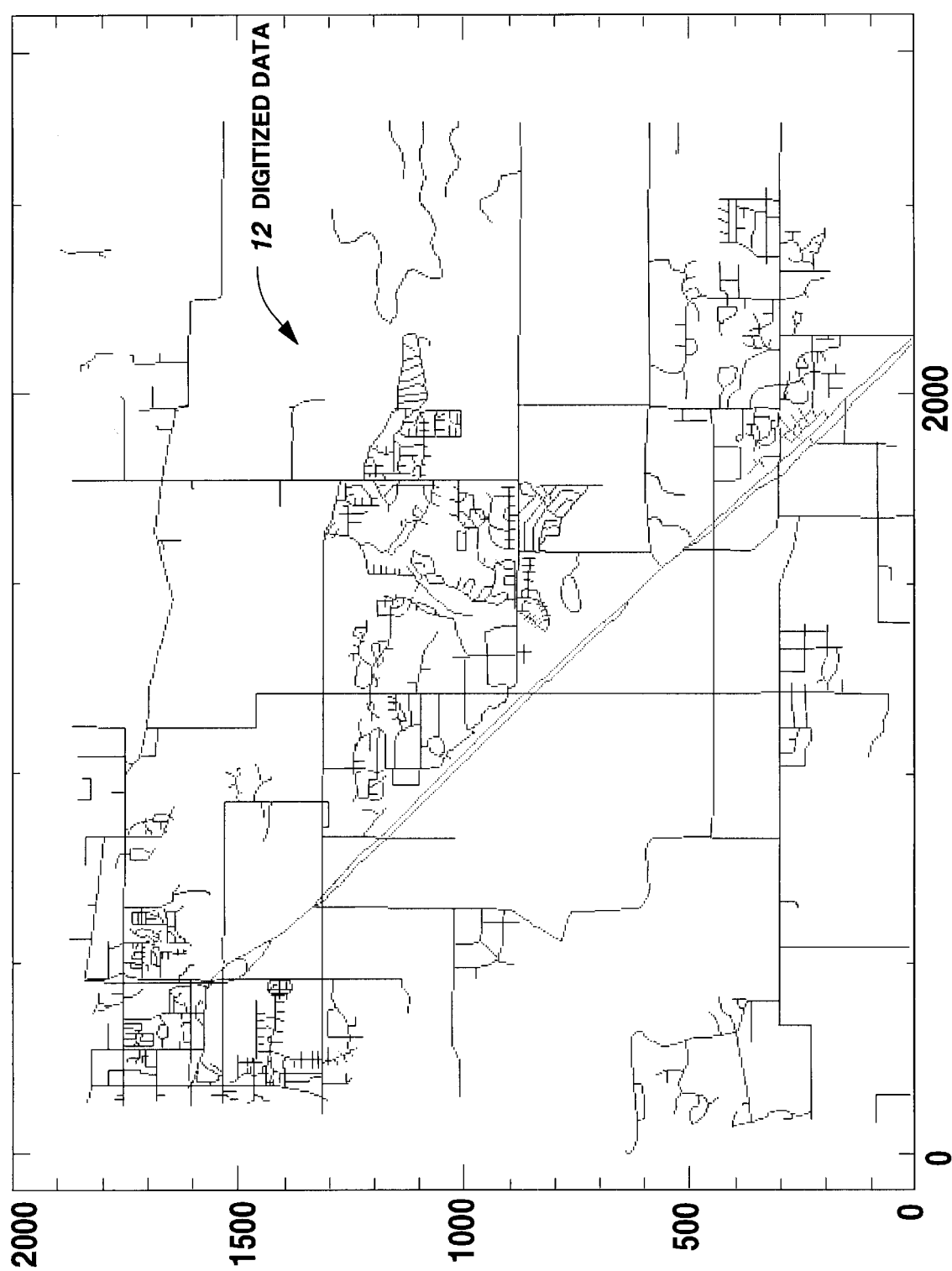
FIG. 2 is an example of a set of digitized data for a corresponding area of the data shown in FIG. 1.

FIG. 2 is a schematic illustration of the digitized data 12. The digitized data 12 is vector data similar to the source data 10. The digitized data 12 is geo-referenced in the same manner as the source data 10, so that identical parameters can be used to locate a position in the digitized data 12 that will correspond to the same position in the source data 10. The digitized data 12 can be generated from aerial photographs from high-flying planes, satellites, and other sources. The digitized data 12 can be compiled into the vector data using conventional techniques.

Figure 3:
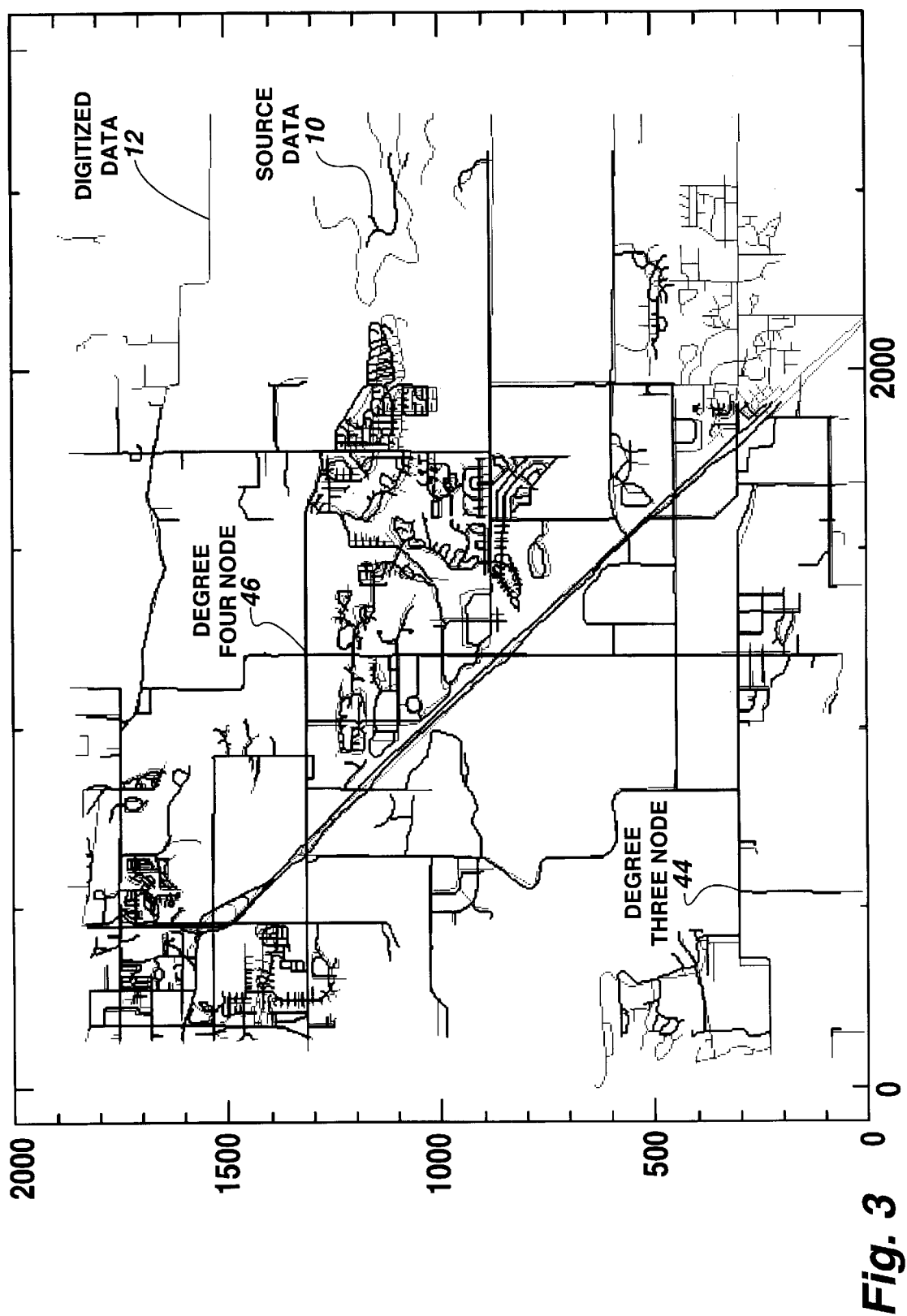
FIG. 3 illustrates the superimposed source data and digitized data.

FIG. 3 illustrates the source data 10 that is superimposed on the digitized data 12 using geo-referenced locations. As can be seen in FIG. 3, the source data does not spatially align with the digitized data. Various distortions of the source data are apparent. For example, rotational distortion, offset, scaling distortion, and other types of distortion are apparent in the source data. Additionally, as is clearly shown in FIG. 3, many of the roads illustrated in the digitized data 12 are missing from the source data 10. This is the result of the fact that the source data 10 is not updated frequently. Hence, a substantial amount of data can be missing from the source data 10 which is shown in the digitized data 12. This is especially true for areas that are developing at a fast rate, such as the area of Boulder, Colo. that is illustrated in FIGS. 1 through 3. Although the digitized data 12 is spatially correct and contains additional data that is not shown in the source data 10, the digitized data 12 does not include any ties to the attribute data. The present invention provides a way of tying corresponding nodes of the source data 10 and the digitized data 12 together so that users of the digitized data 12 can have access to the attribute data. Similarly, the process of matching nodes of the present invention can be used for conflation of the source data to the spatially correct and complete digitized data. FIG. 3 also shows a node 44 having a degree of 3 (i.e., 3 branches), and another node 46 having a degree of 4, (i.e., 4 branches).

Figure 4:
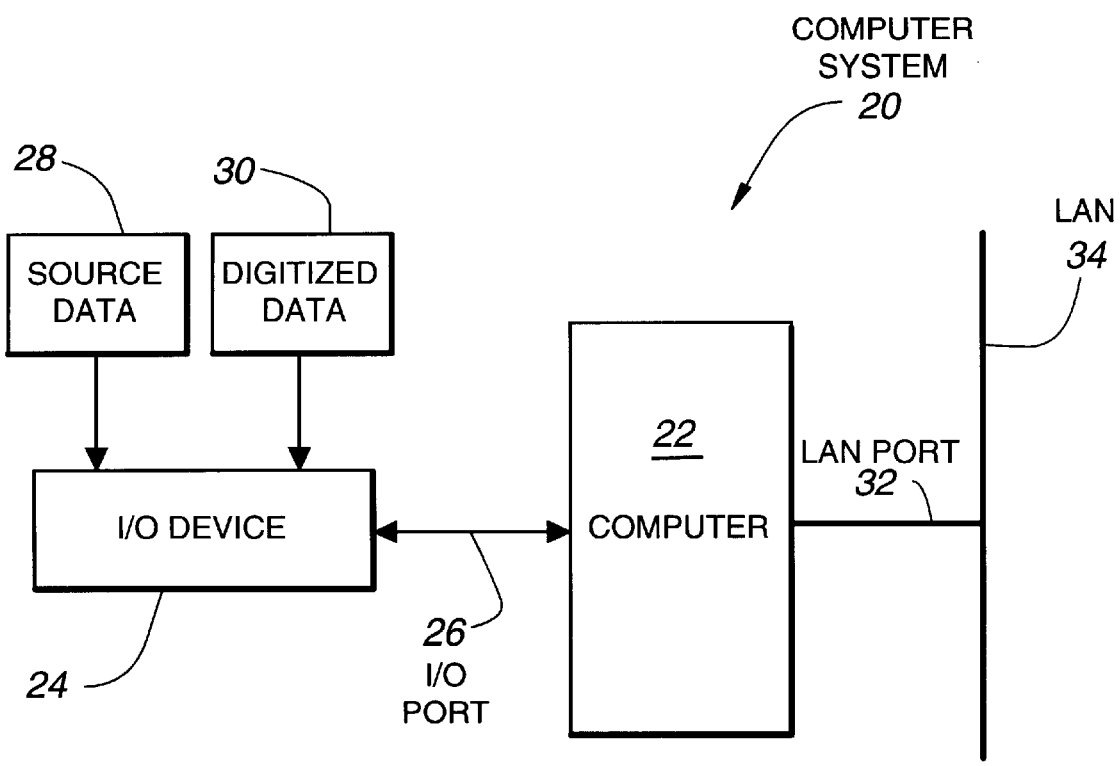
FIG. 4 illustrates a computer system for carrying out the steps of the present invention.

FIG. 4 illustrates a computer system 20 that can be used for matching or tying nodes together in accordance with the present invention. As shown in FIG. 4, a computer 22 can be connected to an I/O device 24 via an I/O port 26. The I/O device can comprise any conventional data storage or data reading device that is capable of reading and transmitting the source data 28 and digitized data 30 to the computer 22. Additionally, the computer may be connected to a LAN port 32 which may be connected to a LAN 34, such that the source data and digitized data may be transmitted to the computer 22 via LAN 34. LAN 34 may, in turn, be connected to other LANs, a WAN, or to the Internet, so that data may be transmitted to computer 22 from remote locations. Computer 22 is programmed to carry out the various steps of tying or matching nodes between the source data and digitized data in accordance with the present invention as disclosed herein.

Figure 5:
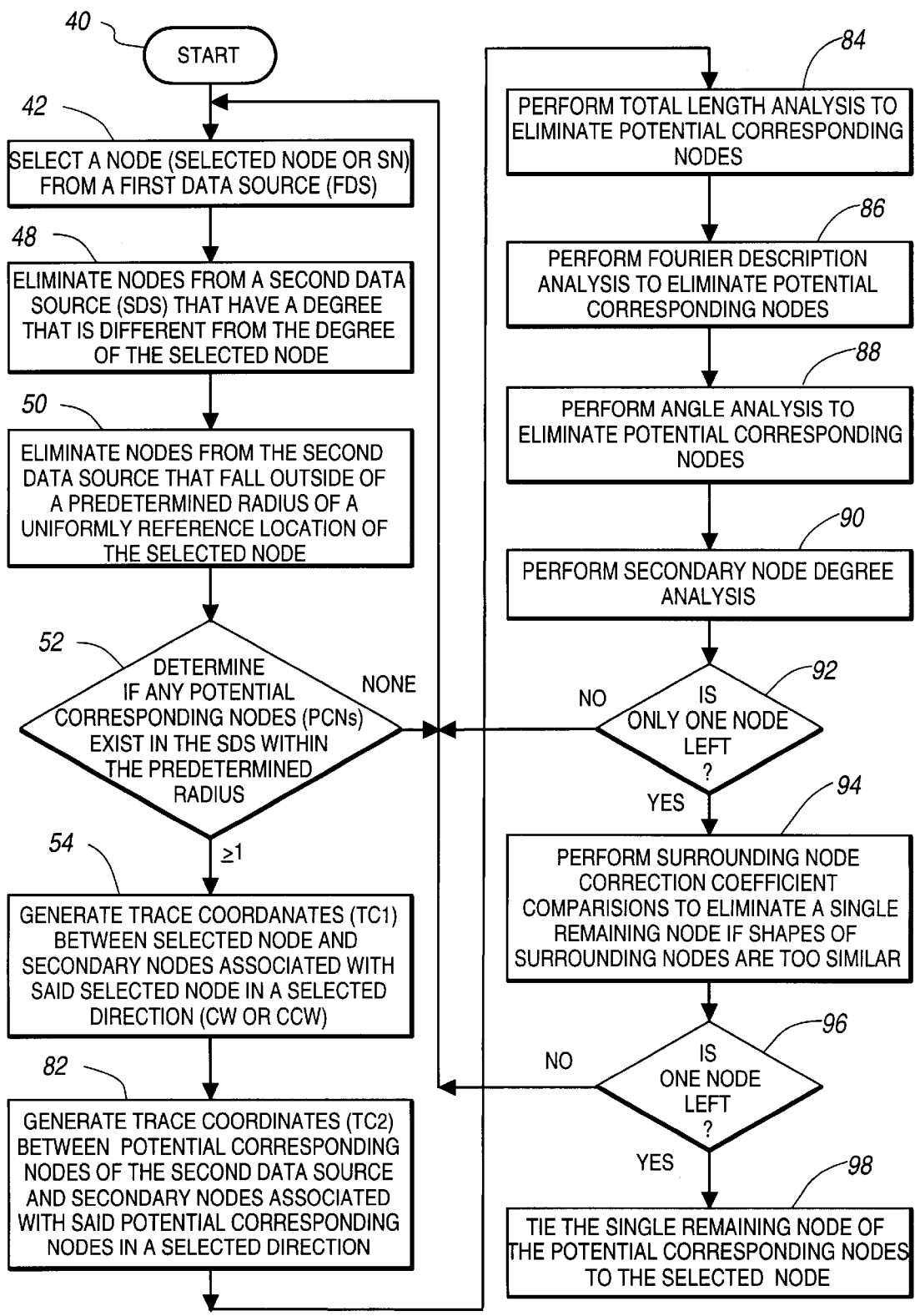
FIG. 5 is a flow diagram illustrating the overall steps of the present invention.

FIG. 5 is a schematic block diagram that illustrates the primary functions that are performed in accordance with the present invention. As illustrated in FIG. 5, the flow diagram starts at reference numeral 40 and proceeds to a selected node from the first data source at 42. The first data source can comprise either the source data or digitized data. A node is selected in the first data source that is desired to be tied to a corresponding node in the second data source. The selection of the node can be made randomly or the node can be selected in accordance with its degree, i.e., the number of branches attached to the particular node. For example, as illustrated in FIG. 3, node 44 has a degree of 3, since there are three branches attached to that node. Similarly, node 46 has a degree of 4, since there are four branches attached to node 46.

At step 48 in the flow diagram of FIG. 5, nodes are eliminated from the second data source that have a degree that is different from the degree of the selected node. In other words, the degree of the selected node of the first data source is determined and then all of the nodes of the second source that have a different degree are eliminated from the list of potential nodes that correspond to the selected node of the first data source. At step 50, nodes are eliminated from the second data source that fall outside of a predetermined radius of a uniformly-referenced location of the selected node. In accordance with this step, a predetermined radius is selected surrounding the selected node. This geo-referenced radius is then used to select the nodes that fall within that radius in the second data source. Since the first data source and the second data source are geo-referenced, nodes are eliminated in the second data source that fall outside of the area that is determined by the predetermined radius.

At step 52 of FIG. 5, it is then determined if any potential corresponding nodes exist in the second data source within the predetermined radius or search circle. If there are none, the program returns to the start 40 and selects another node in the first data source for investigation at step 42. If one or more potential corresponding nodes exist in the second data source, the flow chart continues to step 54. Of course, potential corresponding nodes can comprise any nodes in the second data source that have not been eliminated by any of the steps illustrated in FIG. 5, or steps or any of the other figures. In that regard, it is certainly within the scope and purview of this invention that the various steps illustrated in FIG. 5 and the other figures can be performed in various orders other than that specifically illustrated in FIG. 5 and the other figures. Similarly, various steps can also be eliminated and still fall within the purview of the present invention.

At step 54 of FIG. 5, trace coordinates are generated between the selected node and secondary nodes associated with the selected node in a selected direction, such as clockwise or counter-clockwise. In that regard, FIG. 6 will be referenced at this point to provide a more complete description.

Figure 6:
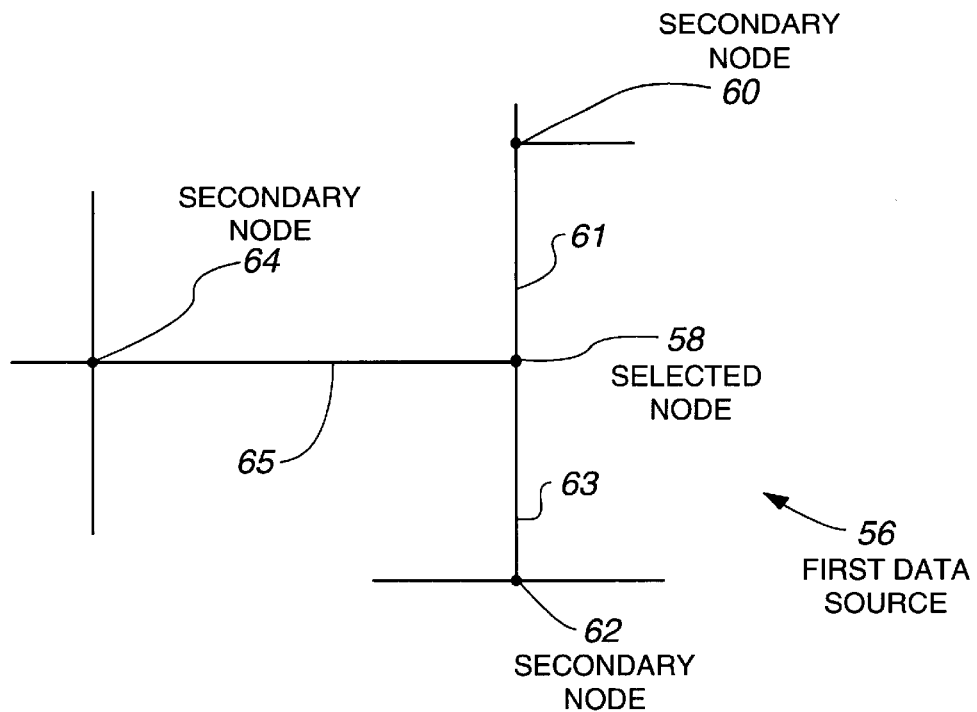
FIG. 6 is an illustration of the first data source showing a selected node and secondary nodes associated with the selected node.

FIG. 6 schematically illustrates a portion of the first data source 56 that includes a selected node 58 and the plurality of secondary nodes 60, 62 and 64 associated with the selected node 58. Since the selected node 58 is a node of degree 3, there are three branches connected to the selected node 58 and three secondary nodes associated with the three branches. Secondary nodes 60 and 62 are nodes of degree 3, while secondary node 64 is node of degree 4. The secondary nodes 60, 62 and 64 are normally the first nodes encountered on each of the branches when moving away from the selected node 58, but do not necessarily have to comprise the first node encountered. As indicated above, the nodes are representative of the intersection of roads that occur in the spatial data, but can be representative of the intersection of any type of data, including circuit lines on integrated circuits, printed circuit boards, etc. Secondary node 60 is associated with the selected node 58 via branch 61, while branch 63 and branch 65 connect secondary nodes 62 and 64, respectively, to selected node 58.

Figure 7:
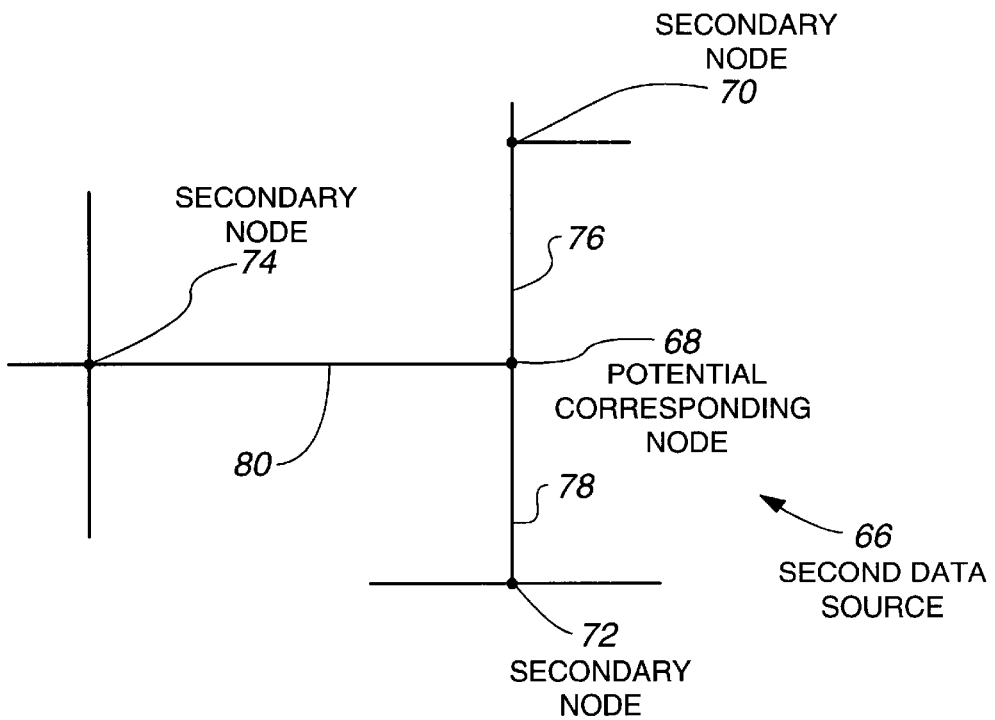
FIG. 7 is a schematic illustration of a second data source having potential corresponding nodes and the secondary nodes associated with the potential corresponding node.

FIG. 7 illustrates the second data source 66 that has a potential corresponding node 68. A series of secondary nodes 70, 72 and 74 are associated with the potential corresponding node 68 in a similar manner as illustrated in FIG. 6. Branches 76, 78 and 80 connect the potential corresponding node 68 to secondary nodes 70, 72 and 74, respectively.

Referring again to FIG. 5, at step 54 the trace coordinates are generated between the selected node 58 of FIG. 6 and each of the secondary nodes 60, 62 and 64 illustrated in FIG. 6. This is done in the following manner. A branch, such as branch 61, is selected and the coordinate locations of each predetermined unit length are recorded for branch 61 from the selected node 58 to the secondary node 60. In other words, a list of x, y coordinates is therefore generated between selected node 58 and secondary node 60 for each predetermined unit length measurement. The unit length can be any desired length, such as the distance between pixels. In that case, the x, y location of the pixel elements that define the path 61 between selected node 58 and secondary node 60 are recorded.

The return path from secondary node 60 to selected node 58, as shown in FIG. 6, is also recorded. A list of x, y coordinates are recorded in the same manner as described above along the path 61 from secondary node 62 selected node 58. This procedure is repeated for path 63 from selected node 58 to selected node 62 and back. Similarly, trace coordinates are recorded in each direction along path 65. In this manner, the trace coordinates are recorded in a clockwise direction around the selected node 58. This could also be performed in a counter-clockwise direction if desired.

A similar procedure can be used with regard to the potential corresponding node 68 of FIG. 7. However, in this instance, any one of the branches 76, 78 or 80 can be selected as the initial branch to start the recordation of trace coordinates. For example, the initial set of trace coordinates may comprise the x, y coordinates along path 78 and back. Since the trace coordinates were recorded in a clockwise direction for the first data source 56, as illustrated in FIG. 6, the next path for recordation of trace coordinates would be path 80, followed by path 76. Hence, it is not necessary that the initial path 61 for the selected node 58 correspond to the initial path 78 for the potential corresponding node 68 as long as the trace coordinates are recorded for paths that are selected in the same direction, in this case a clockwise direction. Of course, the paths can be selected in a counter-clockwise direction also, as mentioned above.

Referring again to FIG. 5, the trace coordinates between the potential corresponding nodes of the second data source and the secondary nodes associated with the potential corresponding nodes are generated in the selected direction in the manner described above. At step 84, a total length analysis is performed to eliminate potential corresponding nodes. This process is more fully described with regard to FIG. 8.

At step 86 of FIG. 5, a fourier descriptor analysis is performed to eliminate potential corresponding nodes. The fourier descriptor analysis is more fully described with regard to FIG. 9.

At step 88 of FIG. 5, an angle analysis is performed to eliminate potential corresponding nodes. This process is more fully described with regard to the description of FIG. 11.

At step 90 of FIG. 5, a secondary node degree analysis is performed. The secondary node degree analysis is more fully described with reference to FIG. 12.

At step 92, as illustrated in FIG. 5, a determination is made as to whether only one node is left. If there are no nodes left, or if there is more than one node left, the process begins again at the start 40. If there is only one node left, the flow chart proceeds to step 94. At step 94, a surrounding node correlation coefficient comparison is performed to eliminate the single remaining node if the shapes of the surrounding nodes are too similar. The surrounding node correlation coefficient comparison is more fully described with reference to FIG. 13.

At step 96 of FIG. 5, it is determined whether there is only one node left. If there are no nodes left, the process returns to the start 40 to select a new node. If there is only one node left, the flow diagram proceeds to step 98 to tie the single remaining node of the potential corresponding nodes to the selected node.

Figure 8:
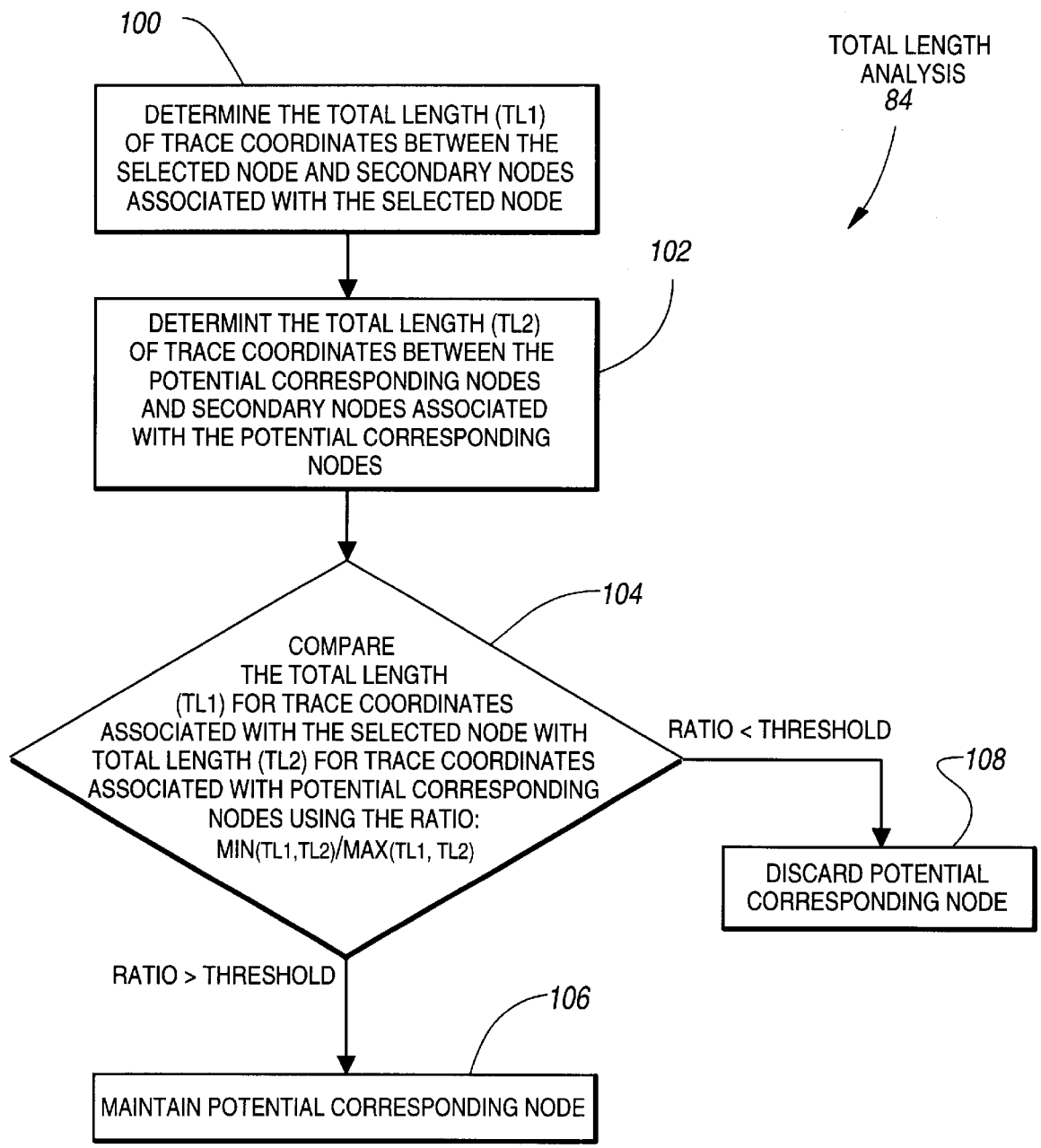
FIG. 8 is a flow diagram illustrating the total length analysis.

FIG. 8 is a flow diagram describing the total length analysis step 84. At step 100 of FIG. 8, the total length of the trace coordinates in the first data source between the selected nodes and the secondary nodes associated with the selected node is determined. In other words, as illustrated in FIG. 6, the total length along path 61 in both directions between nodes 58 and 60, as well as the total length in both directions of path 63 and the total length of path 65 in both directions is calculated. This is accomplished by storing each of the unit lengths along the various paths, such as path 61, as a series of x, y coordinates, and then adding the unit lengths to form a total length.

At step 102 of FIG. 8, the total length of the trace coordinates in the second data source between the potential corresponding nodes and secondary nodes associated with the potential corresponding nodes is calculated for each potential corresponding node, in the same manner as described with regard to the selected node (first data source).

As indicated at step 104 of FIG. 8, the total length for the trace coordinates associated with the selected node is compared with the total length for the trace coordinates associated with the potential corresponding nodes, using a ratio MIN (TL1, TL2)/MAX (TL1, TL2). In other words, the smaller of the total lengths measured is divided by the larger of the total lengths measured. For example, if the total length (TL1) of the trace coordinates between the selected node and the secondary node associated with the selected node is less than the total length (TL2) of the trace coordinates between a potential corresponding node and a secondary node associated with a potential corresponding node, then TL1 is divided by TL2. If TL2 is smaller than TL1, TL2 is divided by TL1. In this way, a ratio number of less than or equal to 1 is generated. The closer the ratio number is to 1.0, the closer the total lengths are to one another. If the comparison indicates that the ratio is greater than a predetermined threshold, the potential corresponding node is maintained as a potential candidate as a tie point at step 106. If the ratio is less than a predetermined threshold, the potential corresponding node is discarded at step 108. Although various predetermined thresholds can be used, a threshold of 0.75 has been utilized.

Figure 9:
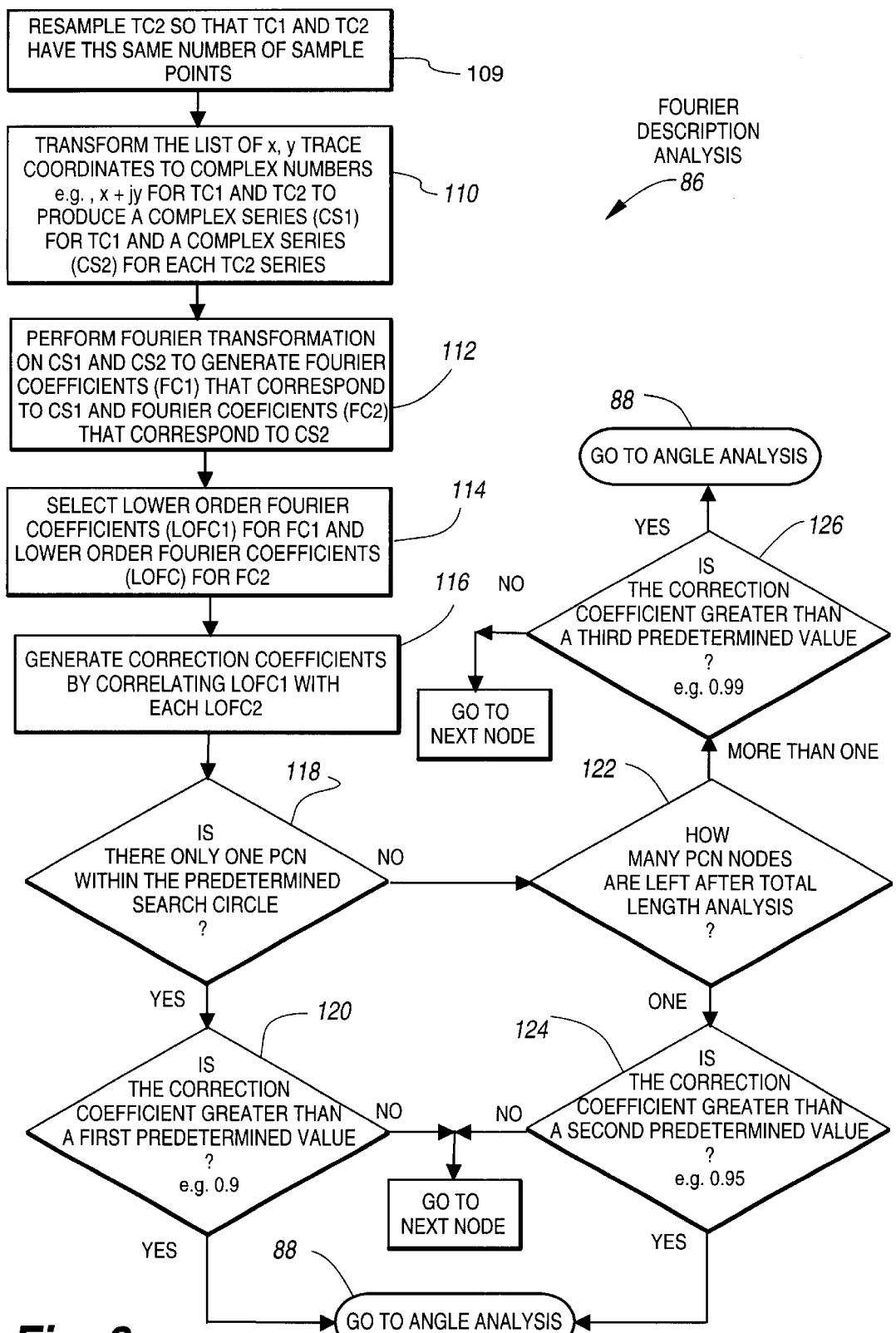
FIG. 9 is a flow diagram illustrating the fourier descriptor analysis.

FIG. 9 discloses the fourier descriptor analysis 86. At step 109, the trace coordinate (TC-2) is resampled so that the number of sample points matches the number of sample points for TC-1. At step 110, the stored list of x, y trace coordinates are changed to a list of complex numbers. This changes the trace coordinates from a two-dimensional series to a one-dimensional series. For example, the trace coordinates x, y are transformed to a complex number x+jy. This is done for both the trace coordinates (TC1) associated with the selected node and the trace coordinates (TC2) associated with each of the potential corresponding nodes. The complex series CS1, corresponds to the trace coordinates, while the complex series CS2, corresponds to the trace coordinates. Complex series CS1 associated with the selected node and the complex series CS2 associated with each of the potential corresponding nodes is stored in the computer system 22 (FIG. 4).

At step 112 of FIG. 9 a fourier transformation is performed on the complex series CS1 and complex series CS2 to generate fourier coefficients FC1 associated with the selected node and fourier coefficients FC2 that are associated with each of the potential corresponding nodes. The fourier coefficients provide shape information relating to the shape generated by the paths of the trace coordinates. For example, the fourier coefficients FC1 associated with the selected node 58 would describe the shape of the paths 61, 63 and 65 (FIG. 6). As shown in FIG. 6, this shape is generally a straight vertical line with a line protruding to the left and centered in about the middle of the straight vertical line. The fourier coefficient FC2 for potential corresponding node 68 would describe a similar shape, as indicated by paths 76, 78 and 80 (FIG. 7).

Figure 10:
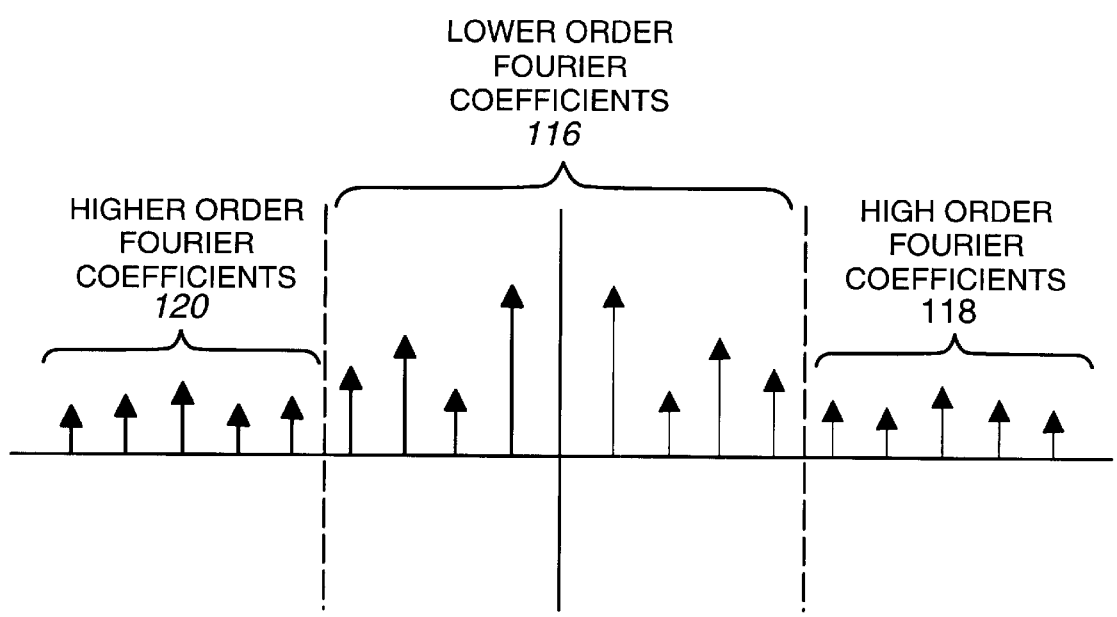
FIG. 10 illustrated the manner in which fourier descriptors are eliminated.

At step 114 of FIG. 9, the lower order fourier coefficients are selected for both FC1 and FC2. Referring to FIG. 10, the lower order fourier coefficients 116 comprise the fourier coefficients that are selected in accordance with the present invention. The higher order coefficients 118 and 120 are eliminated. The lower order coefficients carry general shape information, while the higher order fourier coefficients 118 and 120 define more detailed or finer shape features that are not necessarily useful in the fourier descriptor analysis 86. While these properties are desirable for making a comparison, the fourier coefficients are invariant to starting point, rotation and reflection of the node pattern. In other words, a reflected version of the shape of the trace coordinates would be identical to the non-reflected shape. For example, referring to FIG. 6, if a shape identical to the shape illustrated in FIG. 6 was produced, but the path 65 protruded from the selected node 58 in the right-hand direction rather than the left-hand direction, such a shape would have nearly identical fourier coefficients.

At step 116 of FIG. 9, correlation coefficients are generated by correlating the lower order fourier coefficients associated with the selected node with each of the lower order fourier coefficients that are associated with each of the potential corresponding nodes that are under consideration. The correlation coefficients provide a number having a magnitude that is indicative of the similarity of these lower order fourier coefficients. The correlation coefficients are generated in a standard fashion using standard mathematical principles. The correlation coefficient is a number between 1.0 and −1.0 that indicates the degree of correlation or similarity between these fourier coefficients.

At step 118 of FIG. 9, it is determined whether there is only one potential corresponding node within the predetermined search circle (radius). If there is only one potential corresponding node, then the flow diagram proceeds to step 120 to determine if the correlation coefficient is greater than a first predetermined value, for example, 0.9. If it is not, the process proceeds to go to the next node, i.e., step 40 illustrated in FIG. 5. If the correlation coefficient is greater than 0.9, for example, the process continues and proceeds to the angle analysis 88.

Going back to step 118 of FIG. 9, if there are more than one potential corresponding nodes within the predetermined search circle after the total length analysis, the process proceeds to decision step 122. At step 122 it is determined whether many potential corresponding nodes are left after the total length analysis. If only one potential corresponding node is left after the total length analysis, the process proceeds to step 120, where it is determined if the correlation coefficient is greater than a second predetermined value, for example 0.95. If it is, the process proceeds to the angle analysis step 88. If the correlation coefficient does not exceed the second predetermined value, the process proceeds to step 40 of FIG. 5 to select a next node for consideration.

Referring back to step 122 of FIG. 9, if there is more than one potential corresponding nodes left after the total length analysis, the process proceeds to step 126, where it is determined if the correlation coefficient is greater than a third predetermined value, for example 0.99. If it is, the process proceeds to the angle analysis step 88. If the correlation coefficient is not greater than 0.99, the process returns to step 40 of FIG. 5 to select the next node.

Figure 11:
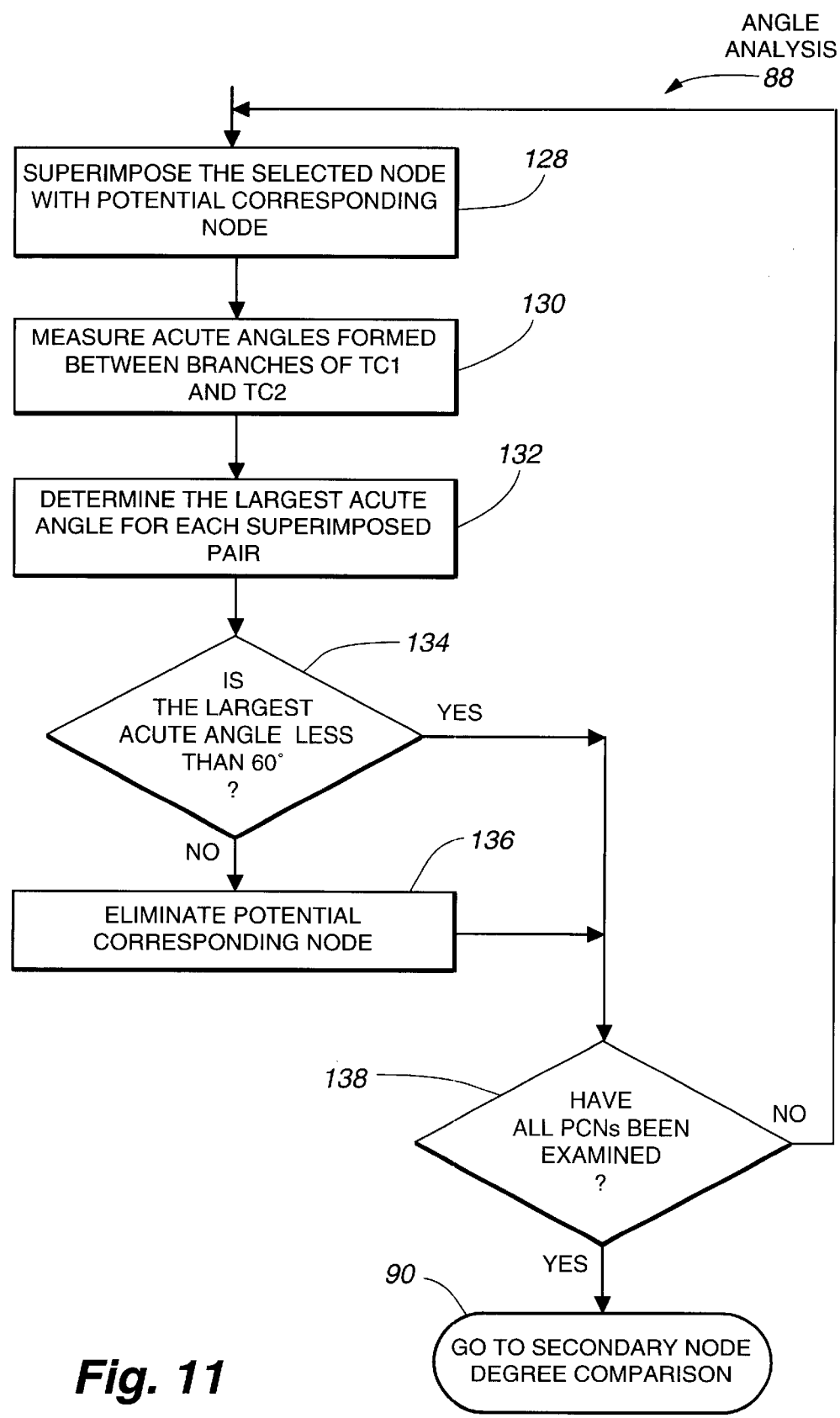
FIG. 11 is a flow diagram illustrating the angle analysis.

FIG. 11 is a flow diagram illustrating the angle analysis step 88. As described above, the fourier descriptors do not distinguish reflected patterns. Hence, the angle analysis step 88 is used to eliminate potential corresponding nodes that have high correlation coefficients which result from a reflected pattern. At step 128, the selected node and the potential corresponding node are superimposed with the nodes in question as the common origin. At step 130, all of the feasible combinations of the acute angles formed between the particular branch or path of the preselected node and an associated secondary node is measured with respect to each of the paths or branches formed between the potential corresponding node and its associated secondary nodes. At step 132, the largest acute angles formed for each superimposed pair are determined. At step 134 the largest acute angles are determined whether they are below a predetermined maximum angle. For example, it is determined whether the largest acute angle falls below 60 degrees. If the largest acute angle does not fall below 60 degrees, then that potential corresponding node is eliminated as a reflection at step 136. If the largest acute angle does fall below 60 degrees, then the process proceeds to step 138, where it is determined if all of the potential corresponding nodes have been examined. If they have not, the process returns to step 128. If all potential corresponding nodes have been examined, the process proceeds to the secondary node degree analysis step 90.

Figure 12:
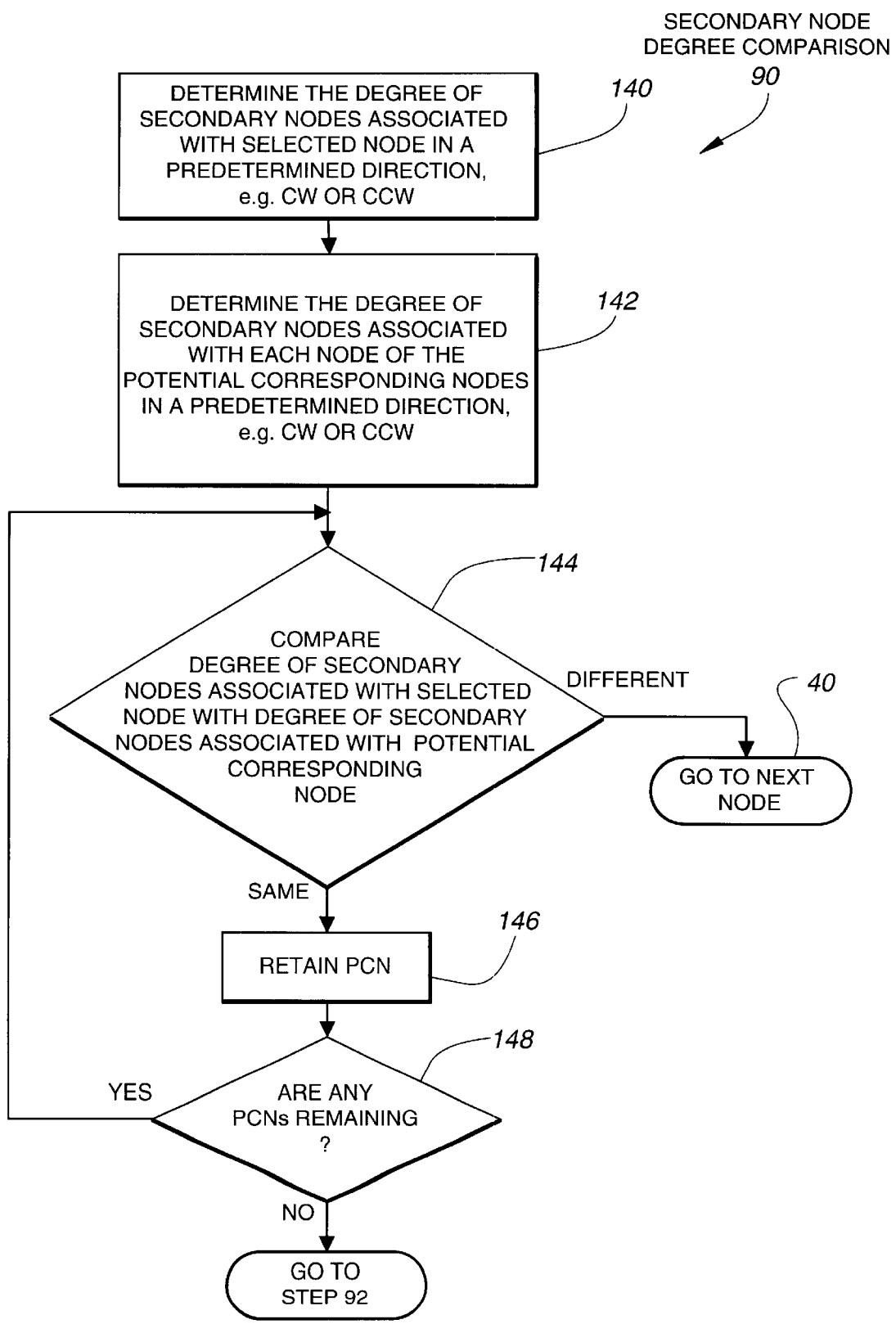
FIG. 12 is a flow diagram illustrating the secondary node degree comparison.

FIG. 12 is a flow diagram illustrating the secondary node degree comparison step 90. The purpose of this step is to determine if the secondary nodes associated with the selected node have the same degree as the secondary nodes associated with the potential corresponding node. At step 140, the degree of the secondary nodes associated with the selected node are determined in a predetermined direction, such as clockwise or counter-clockwise. At step 142, the degree of the secondary nodes associated with each of the potential corresponding nodes is determined in the same predetermined direction, that is, either clockwise or counter-clockwise. At decision step 144, the degree of the secondary nodes associated with the selected node is compared with the degree of the secondary nodes associated with the potential corresponding node. If they are different, the process proceeds to step 40 of FIG. 5 and the next node is selected. If they are the same, the potential corresponding node is retained at step 146. At step 148, it is determined whether there are any remaining potential corresponding nodes. If so, the process returns to step 144. If not, the process proceeds to step 92.

Figure 13:
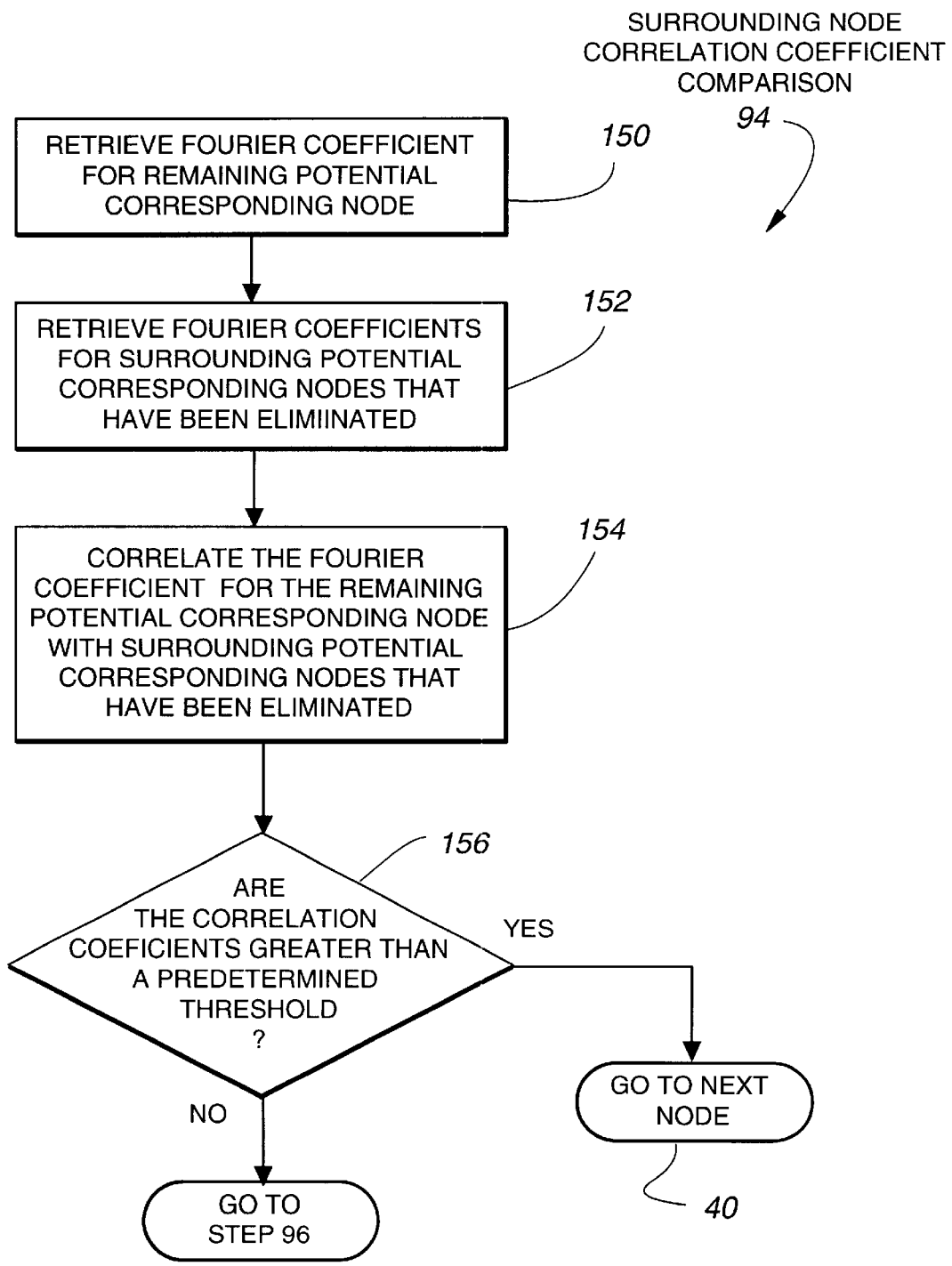
FIG. 13 is a flow diagram illustrating the surrounding node correlation coefficient comparison.

FIG. 13 discloses the flow diagram for carrying out the surrounding node correlation coefficient comparison step 94. At step 150, the fourier coefficient for the single remaining potential corresponding node is retrieved from storage. At step 152 the fourier coefficients for nodes that surround the remaining potential corresponding node are retrieved from storage. The surrounding nodes may have been previously been eliminated in other steps. At step 154, the fourier coefficient for the single remaining potential corresponding node is correlated with the fourier coefficients for surrounding nodes that have been eliminated. If the correlation coefficients are greater than a predetermined threshold, the process proceeds to step 40 of FIG. 5 and the next node is selected. If the correlation coefficients are not greater than a predetermined threshold the process proceeds to step 96 of FIG. 5. A high degree of correlation between the fourier coefficients of the single remaining potential corresponding node with surrounding nodes indicates that the surrounding shapes are very similar. For example, this can occur when a series of interconnecting roads such as in an apartment complex form a series of rectangular shapes that are similar. In this sort of circumstance, it is more likely that a slight shift can occur that would allow an improper node to be selected.

The present invention therefore provides a unique and novel procedure and device for matching nodes between separate data sources. This technique of node matching can be used for conflation of source data to digitized data, or can provide a link between the digitized data and source data to allow retrieval of attribute data from the digitized data.

The foregoing description of the invention has been presented for purposes of illustration and description. It is not intended to be exhaustive or to limit the invention to the precise form disclosed, and other modifications may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments of the invention except insofar as limited by the prior art.

What is claimed is:

1. A process of tying a selected node of a first data source to a corresponding node of a second data source comprising the steps of:
   generating trace coordinates between said selected node of said first data source and one or more secondary nodes of said first data source associated with said selected node;
   generating trace coordinates between potential corresponding nodes of said second data source and one or more secondary nodes of said second data source associated with said potential corresponding nodes;
   generating a fourier descriptor of said trace coordinates associated with said selected node;
   generating fourier descriptors of said trace coordinates associated with said potential corresponding nodes;
   comparing said fourier descriptors of said trace coordinates associated with said selected node with said fourier descriptors of said trace coordinates associated with said potential corresponding nodes to eliminate nonrelevant potential corresponding nodes of said potential corresponding nodes;
   tying said selected node to a single remaining node of said potential corresponding nodes that corresponds to said corresponding node.

2. The process of claim 1 further comprising the step of:
   eliminating nonrelevant potential corresponding nodes that have a degree that is different from the degree of said selected node.

3. The process of claim 1 further comprising the step of:
   eliminating nonrelevant potential corresponding nodes by comparing total length measurements of said trace coordinates associated with said selected node with said trace coordinates associated with said potential corresponding nodes.

4. The process of claim 1 further comprising the step of:
   eliminating nonrelevant potential corresponding nodes by performing an angle analysis between said trace coordinates associated with said selected node and said trace coordinates associated with said potential corresponding nodes.

5. The process of claim 1 further comprising the step of:
   eliminating nonrelevant potential corresponding nodes by comparing the degree of secondary nodes associated with said selected node with the degree of secondary nodes associated with said potential corresponding nodes.

6. The process of claim 1 further comprising the step of:
   eliminating nonrelevant potential corresponding nodes by comparing correlation coefficients of nodes that surround said potential corresponding node.

7. The process of claim 2 further comprising the step of:
   eliminating nonrelevant potential corresponding nodes by comparing total length measurements of said trace coordinates associated with said selected node with said trace coordinates associated with said potential corresponding nodes.

8. The process of claim 3 further comprising the step of:
   eliminating nonrelevant potential corresponding nodes by performing an angle analysis between said trace coordinates associated with said selected node and said trace coordinates associated with said potential corresponding nodes.

9. The process of claim 4 further comprising the step of:
   eliminating nonrelevant potential corresponding nodes by comparing the degree of secondary nodes associated with said selected node with the degree of secondary nodes associated with said potential corresponding nodes.

10. The process of claim 5 further comprising the step of:
    eliminating nonrelevant potential corresponding nodes by comparing correlation coefficients of nodes that surround said potential corresponding nodes.

11. The process of claim 1 wherein said step of generating trace coordinates between said selected node of said first data source and secondary nodes associated with said selected node further comprises the steps of:
    (a) generating first trace coordinates from said selected node to an initial secondary node;
    (b) storing said first trace coordinates;
    (c) generating second trace coordinates from said initial secondary node back to said selected node;
    (d) storing said second trace coordinates;
    (e) repeating steps (a) through (d) for each secondary node associated with said selected node so that said trace coordinates between said selected node of said first data source and said secondary nodes have a first selected number of sampling points.

12. The process of claim 11 wherein said step of generating trace coordinates between said potential corresponding nodes and secondary nodes associated with said potential corresponding nodes further comprises the steps of:
    (a) generating first trace coordinates from each of said potential corresponding nodes to an initial secondary node;
    (b) storing said first trace coordinates;
    (c) generating second trace coordinates from said initial secondary node back to each of said potential corresponding nodes;
    (d) storing said second trade coordinates;
    (e) repeating steps (a) through (d) for each secondary node associated with each of said potential corresponding nodes;
    (f) resampling said trace coordinates between said potential corresponding nodes and secondary nodes so that said trace coordinates between said potential corresponding nodes and said secondary nodes have a second selected number of sampling points that is equal to said first selected number of sampling points.

13. The process of claim 1 wherein said steps of generating fourier descriptors comprises the steps of:
    changing said trace coordinates into a series of complex numbers;
    performing a fourier transformation on said series of complex numbers to generate a series of fourier descriptors;
    eliminating higher order descriptors of said series of fourier descriptors to produce said fourier descriptors.

14. The process of claim 1 wherein said step of comparing further comprises:
    generating correlation coefficients by correlating said fourier descriptors of said trace coordinate associated with said selected node with said fourier descriptors of said trace coordinates associated with said potential corresponding nodes;
    eliminating nonrelevant potential corresponding nodes having a correlation coefficient associated with the selected node that is below at least one predetermined threshold.

15. The process of claim 4 wherein said step of eliminating nonrelevant potential corresponding nodes by performing an angle analysis comprises the steps of:

superimposing said select node with each of said potential corresponding nodes;

measuring acute angles formed between each branch of said trace coordinates associated with said selected node and said trace coordinates associated with each of said potential corresponding nodes;

determining the largest acute angle for each superimposed pair;

eliminating nonrelevant potential corresponding nodes whenever said largest acute angle falls below a predetermined number of degrees.

16. A computer system that is programmed to tie a selected node of a first data source to a corresponding node of a second data source by performing at least the following steps:

generating trace coordinates between said selected node of said first data source and one or more secondary nodes of said first data source associated with said selected node;

generating trace coordinates between potential corresponding nodes of said second data source and one or more secondary nodes of said second data source associated with said potential corresponding nodes;

generating fourier descriptors of said trace coordinates associated with said selected node;

generating fourier descriptors of said trace coordinates associated with said potential corresponding nodes;

comparing said fourier descriptors of said trace coordinates associated with said selected node with said fourier descriptors of said trace coordinates associated with each of said potential corresponding nodes to eliminate nonrelevant potential corresponding nodes of said potential corresponding nodes;

tying said selected node to a single remaining node of said potential corresponding nodes that corresponds to said corresponding node.

17. The computer system of claim 16 that is programmed to perform the additional following steps:

eliminating nonrelevant potential corresponding nodes by comparing total length measurements of said trace coordinates associated with said selected node with said trace coordinates associated with said potential corresponding nodes.

18. The computer system of claim 16 that is programmed to perform the additional following step:

eliminating nonrelevant potential corresponding nodes by performing an angle analysis between said trace coordinates associated with said selected node and said trace coordinates associated with said potential corresponding nodes.

19. The computer system of claim 16 that is programmed to perform the additional following step:

eliminating nonrelevant potential corresponding nodes by comparing the degree of secondary nodes associated with said selected node with the degree of secondary nodes associated with said potential corresponding nodes.

20. The computer system of claim 16 that is programmed to perform the additional following step:

eliminating nonrelevant potential corresponding nodes by comparing correlation coefficients of nodes that surround said potential corresponding node.

21. The computer system of claim 16 that is programmed such that the step of generating trace coordinates between said selected node of said first data source and secondary nodes includes the additional following steps:

(a) generating first trace coordinates from said selected node to an initial secondary node;

(b) storing said first trace coordinates;

(c) generating second trace coordinates from said initial secondary node back to said selected node;

(d) storing said second trace coordinates;

(e) repeating steps (a) through (d) for each secondary node associated with said selected node so that said trace coordinates between said selected node of said first data source and said secondary nodes have a first selected number of sampling points.

22. The computer system of claim 21 that is programmed such that the step of generating trace coordinates between said potential corresponding nodes and secondary nodes includes the additional following steps:

(a) generating first trace coordinates from each of said potential corresponding nodes to an initial secondary node;

(b) storing said first trace coordinates;

(c) generating second trace coordinates from said initial secondary node back to each of said potential corresponding nodes;

(d) storing said second trade coordinates;

(e) repeating steps (a) through (d) for each secondary node associated with each of said potential corresponding nodes;

(f) resampling said trace coordinates between said potential corresponding nodes and secondary nodes so that said trace coordinates between said potential corresponding nodes and said secondary nodes have a second selected number of sampling points that is equal to said first selected number of sampling points.

23. The computer system of claim 16 that is programmed such that the step of generating fourier descriptors includes the additional following steps:

changing said trace coordinates into a series of complex numbers;

performing a fourier transformation on said series of complex numbers to generate a series of fourier descriptors;

eliminating higher order descriptors of said series of fourier descriptors to produce said fourier descriptors.

24. The computer system of claim 16 that is programmed such that the steps of comparing further includes the additional following steps:

generating correlation coefficients by correlating said fourier descriptors of said trace coordinate associated with said selected node with said trace coordinates associated with said potential corresponding nodes;

eliminating nonrelevant potential corresponding nodes having a correlation coefficient associated with the selected node that is below at least one predetermined threshold.

25. The computer system of claim 18 that is programmed such that the step of eliminating nonrelevant potential corresponding nodes by performing angle analysis includes the additional following steps:

superimposing said selected node with each of said potential corresponding nodes;

measuring acute angle formed between each branch of said trace coordinates associated with said selected node and said trace coordinates associated with each of said potential corresponding nodes;

determining the largest acute angle for each superimposed pair;

eliminating nonrelevant potential corresponding nodes whenever said largest acute angle falls below a predetermined number of degrees.

26. A computer-readable medium that contains program code that is capable of causing a computer to perform a process of tying a selected node of a first data source to a corresponding node of a second data source in accordance with the following steps comprising:

generating trace coordinates between said selected node of said first data source and one or more secondary nodes of said first data source associated with said selected node;

generating trace coordinates between potential corresponding nodes of said second data source and one or more secondary nodes of said second data source associated with said potential corresponding nodes;

generating a fourier descriptor of said trace coordinates associated with said selected node;

generating fourier descriptors of said trace coordinates associated with said potential corresponding nodes;

comparing said fourier descriptors of said trace coordinates associated with said selected node with said fourier descriptors of said trace coordinates associated with said potential corresponding nodes to eliminate nonrelevant potential corresponding nodes of said potential corresponding nodes of said potential corresponding nodes;

tying said selected node to a single remaining node of said potential corresponding nodes that corresponds to said corresponding node.

27. The storage medium of claim 26 wherein said program code is capable of causing said computer to perform the additional steps of:

eliminating nonrelevant potential corresponding nodes that have a degree that is different from the degree of said selected node.

28. The storage medium of claim 26 wherein said program code is capable of causing said computer to perform the additional steps of:

eliminating nonrelevant potential corresponding nodes by comparing total length measurements of said trace coordinates associated with said selected node with said trace coordinates associated with said potential corresponding nodes.

29. The storage medium of claim 26 wherein said program code is capable of causing said computer to perform the additional steps of:

eliminating nonrelevant potential corresponding nodes by performing an angle analysis between said trace coordinates associated with said selected node and said trace coordinates associated with said potential corresponding nodes.

30. The storage medium of claim 26 wherein said program code is capable of causing said computer to perform the additional steps of:

eliminating nonrelevant potential corresponding nodes by comparing the degree of secondary nodes associated with said selected node with the degree of secondary nodes associated with said potential corresponding nodes.

31. The storage medium of claim 26 wherein said program code is capable of causing said computer to perform the additional steps of:

eliminating nonrelevant potential corresponding nodes by comparing correlation coefficients of nodes that surround said potential corresponding node.

32. The storage medium of claim 26 wherein said program code is capable of causing said step of generating trace coordinates between said selected node of said first data source and secondary nodes to include the additional steps of:

(a) generating first trace coordinates from said selected node to an initial secondary node;

(b) storing said first trace coordinates;

(c) generating second trace coordinates from said initial secondary node back to said selected node;

(d) storing said second trace coordinates;

(e) repeating steps (a) through (d) for each secondary node associated with said selected node so that said trace coordinates between said selected node of said first data source and said secondary nodes have a first selected number of sampling points.

33. The storage medium of claim 32 wherein said program code is capable of causing said step of generating trace coordinates between said potential corresponding nodes and secondary nodes includes the additional steps of:

(a) generating first trace coordinates from each of said potential corresponding nodes to an initial secondary node;

(b) storing said first trace coordinates;

(c) generating second trace coordinates from said initial secondary node back to each of said potential corresponding nodes;

(d) storing said second trade coordinates;

(e) repeating steps (a) through (d) for each secondary node associated with each of said potential corresponding nodes;

(f) resampling said trace coordinates between said potential corresponding nodes and secondary nodes so that said trace coordinates between said potential corresponding nodes and said secondary nodes have a second selected number of sampling points that is equal to said first selected number of sampling points.

34. The storage medium of claim 26 wherein said program code is capable of causing said step of generating fourier descriptors to include the additional steps of:

changing said trace coordinates into a series of complex numbers;

performing a fourier transformation on said series of complex numbers to generate a series of fourier descriptors;

eliminating higher order descriptors of said series of fourier descriptors to produce said fourier descriptors.

35. The storage medium of claim 26 wherein said program code is capable of causing said step of comparing to include the additional steps of:

generating correlation coefficients by correlating said fourier descriptors of said trace coordinate associated with said selected node with said trace coordinates associated with said potential corresponding nodes;

eliminating nonrelevant potential corresponding nodes having a correlation coefficient associated with the selected node that is below at least one predetermined threshold.

36. The storage medium of claim 29 wherein said program code is capable of causing said step of performing angle analysis to include the additional steps of:

superimposing said selected node with each of said potential corresponding nodes;

measuring acute angles formed between each branch of said trace coordinates associated with said selected node and said trace coordinates associated with each of said potential corresponding nodes;

determining the largest acute angle for each superimposed pair;

eliminating nonrelevant potential corresponding nodes whenever said largest acute angle falls below a predetermined number of degrees.

37. A computer system that is programmed to tie a selected node of a first data source to a corresponding node of a second data source comprising:

means for generating trace coordinates between said selected node and one or more secondary nodes associated with said selected node;

means for generating trace coordinates between potential corresponding nodes of said second data source and one or more secondary nodes associated with said potential corresponding nodes;

means for generating fourier descriptors of said trace coordinates associated with said selected node;

means for generating fourier descriptors of said trace coordinates associated with said potential corresponding nodes;

means for comparing said fourier descriptors of said trace coordinates associated with said selected node with said fourier descriptors of said trace coordinates associated with said potential corresponding nodes to eliminate nonrelevant potential corresponding nodes of said potential corresponding nodes;

means for tying said selected node to a single remaining node of said potential corresponding nodes that corresponds to said corresponding node.

38. The computer system of claim 37 further comprising:

means for eliminating nonrelevant potential corresponding nodes that have a degree that is different from the degree of said selected node.

39. The computer system of claim 37 further comprising:

means for eliminating nonrelevant potential corresponding nodes by comparing total length measurements of said trace coordinates associated with said selected node with said trace coordinates associated with said potential corresponding nodes.

40. The computer system of claim 37 further comprising:

means for eliminating nonrelevant potential corresponding nodes by performing an angle analysis between said trace coordinates associated with said selected node and said trace coordinates associated with said potential corresponding nodes.

41. The computer system of claim 37 further comprising:

means for eliminating nonrelevant potential corresponding nodes by comparing the degree of secondary nodes associated with said selected node with the degree of secondary nodes associated with said potential corresponding nodes.

42. The computer system of claim 37 further comprising:

means for eliminating nonrelevant potential corresponding nodes by comparing correlation coefficients of nodes that surround said potential corresponding note have been eliminated.

43. A process of associating a selected node of a first data source with a corresponding node of a second data source comprising the steps of:

identifying said selected node and one or more secondary nodes of said first data source;

identifying potential corresponding nodes and one or more secondary nodes of said second data source;

generating trace coordinates between said selected node and said secondary nodes of said first data source;

generating trace coordinates between potential corresponding nodes and said secondary nodes of said second data source;

generating a fourier descriptor of said trace coordinates associated with said selected node;

generating fourier descriptors of said trace coordinates associated with said potential corresponding nodes; and comparing said fourier descriptors of said trace coordinates associated with said selected node with said fourier descriptors of said trace coordinates associated with said potential corresponding nodes to eliminate nonrelevant potential corresponding nodes of said potential corresponding nodes, whereby a single remaining node of said potential corresponding nodes is identified as said corresponding node.

44. A computer system that is programmed to associate a selected node of a first data source with a corresponding node of a second data source comprising the steps of:

identifying said selected node and one or more secondary nodes of said first data source;

identifying potential corresponding nodes and one or more secondary nodes of said second data source;

generating trace coordinates between said selected node and said secondary nodes of said first data source;

generating trace coordinates between potential corresponding nodes and said secondary nodes of said second data source;

generating a fourier descriptor of said trace coordinates associated with said selected node;

generating fourier descriptors of said trace coordinates associated with said potential corresponding nodes; and comparing said fourier descriptors of said trace coordinates associated with said selected node with said fourier descriptors of said trace coordinates associated with said potential corresponding nodes to eliminate nonrelevant potential corresponding nodes of said potential corresponding nodes, whereby a single remaining node of said potential corresponding nodes is identified as said corresponding node.

45. A computer-readable medium that contains program code that is capable of causing a computer to perform a process of associating a selected node of a first data source with a corresponding node of a second data source comprising the steps of:

identifying said selected node and one or more secondary nodes of said first data source;

identifying potential corresponding nodes and one or more secondary nodes of said second data source;

generating trace coordinates between said selected node and said secondary nodes of said first data source;

generating trace coordinates between potential corresponding nodes and said secondary nodes of said second data source;

generating a fourier descriptor of said trace coordinates associated with said selected node;

generating fourier descriptors of said trace coordinates associated with said potential corresponding nodes; and comparing said fourier descriptors of said trace coordinates associated with said selected node with said fourier descriptors of said trace coordinates associated with said potential corresponding nodes to eliminate nonrelevant potential corresponding nodes of said potential corresponding nodes, whereby a single remaining node of said potential corresponding nodes is identified as said corresponding node.

46. A computer system that is programmed to associate a selected node of a first data source with a corresponding node of a second data source comprising the steps of:

means for identifying said selected node and one or more secondary nodes of said first data source;

means for identifying potential corresponding nodes and one or more secondary nodes of said second data source;

means for generating trace coordinates between said selected node and said secondary nodes of said first data source;

means for generating trace coordinates between potential corresponding nodes and said secondary nodes of said second data source;

means for generating a fourier descriptor of said trace coordinates associated with said selected node;

means for generating fourier descriptors of said trace coordinates associated with said potential corresponding nodes; and means for comparing said fourier descriptors of said trace coordinates associated with said selected node with said fourier descriptors of said trace coordinates associated with said potential corresponding nodes to eliminate nonrelevant potential corresponding nodes of said potential corresponding nodes, whereby a single remaining node of said potential corresponding nodes is identified as said corresponding node.

* * * * *